US010162558B2

(12) United States Patent
Zhang et al.

(10) Patent No.: US 10,162,558 B2
(45) Date of Patent: Dec. 25, 2018

(54) DATA TRANSFER TECHNIQUES FOR MULTIPLE DEVICES ON A SHARED BUS

(71) Applicant: MICRON TECHNOLOGY, INC., Boise, ID (US)

(72) Inventors: Yihua Zhang, Folsom, CA (US); James Cooke, Punta Gorda, FL (US)

(73) Assignee: MICRON TECHNOLOGY, INC., Boise, ID (US)

( * ) Notice: Subject to any disclaimer, the term of this patent is extended or adjusted under 35 U.S.C. 154(b) by 114 days.

(21) Appl. No.: 14/928,988

(22) Filed: Oct. 30, 2015

(65) Prior Publication Data

US 2017/0123715 A1 May 4, 2017

(51) Int. Cl.
*G06F 12/00* (2006.01)
*G06F 3/06* (2006.01)
*G06F 13/40* (2006.01)
*G06F 13/42* (2006.01)

(52) U.S. Cl.
CPC ............ *G06F 3/0647* (2013.01); *G06F 3/061* (2013.01); *G06F 3/0683* (2013.01); *G06F 13/4068* (2013.01); *G06F 13/4282* (2013.01)

(58) Field of Classification Search
CPC ................................ G06F 12/00; G06F 3/0629
USPC .......................................... 711/100, 154, 165
See application file for complete search history.

(56) References Cited

U.S. PATENT DOCUMENTS

| 5,666,516 | A * | 9/1997 | Combs ................ G06F 12/1408 365/195 |
| 6,839,287 | B2 | 1/2005 | Brucklmayr et al. |
| 7,652,922 | B2 * | 1/2010 | Kim .................... G06F 13/4243 365/185.11 |
| 7,710,758 | B2 | 5/2010 | Jo |
| 8,473,811 | B2 | 6/2013 | Jo et al. |
| 8,654,601 | B2 * | 2/2014 | Oh ........................ G11C 7/1021 365/219 |
| 9,047,942 | B2 | 6/2015 | Best |

(Continued)

FOREIGN PATENT DOCUMENTS

| EP | 1239488 A2 | 11/2002 |
| TW | 201112002 A | 4/2011 |

OTHER PUBLICATIONS

ISA/KR, International Search Report and Written Opinion of the International Searching Authority, Int'l. Appl. No. PCT/US2016/058898, dated Feb. 8, 2017, Korean Intellectual Property Office, Daejeon, Republic of Korea, 19 pgs.

*Primary Examiner* — Tuan V Thai
(74) *Attorney, Agent, or Firm* — Holland & Hart LLP

(57) ABSTRACT

Direct data transfer between devices having a shared bus may be implemented with reduced involvement from a controller associated with the devices. A controller, a source memory device, and a target memory device may be coupled with a shared bus. The controller may identify a source address at the source memory device for data to be transferred to the target memory device. The controller also may identify a target address in the target memory device, and initiate a data transfer directly from the source to the target through a command that is received at both the source and the target memory device. In response to the command, the source memory device may read data out to the bus, and the target memory may read the data from the bus and store the data starting at the target address without further commands from the controller.

31 Claims, 7 Drawing Sheets

(56) References Cited

U.S. PATENT DOCUMENTS

| | | | |
|---|---|---|---|
| 2009/0046533 A1* | 2/2009 | Jo | G06F 13/1694 365/230.03 |
| 2009/0216964 A1* | 8/2009 | Palladino | G06F 13/28 711/154 |
| 2011/0126066 A1* | 5/2011 | Jo | G06F 13/28 714/746 |
| 2012/0151159 A1* | 6/2012 | Muralimanohar | A01N 65/00 711/154 |
| 2014/0222410 A1* | 8/2014 | Lin | G06F 9/4552 703/23 |

* cited by examiner

DATA TRANSFER TECHNIQUES FOR MULTIPLE DEVICES ON A SHARED BUS

BACKGROUND

The following relates generally to data transfer between devices and more specifically to data transfer techniques for multiple devices on a shared bus.

Memory devices are widely used to store information in various electronic devices such as computers, wireless communication devices, cameras, digital displays, and the like. Information is stored by programming different states of a memory device. For example, binary devices have two states, often denoted by a logic "1" or a logic "0." In other systems, more than two states may be stored. To access the stored information, the electronic device may read, or sense, the stored state in the memory device. To store information, the electronic device may write, or program, the state in the memory device.

Multiple types of memory devices exist, including random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, and others. Memory devices may be volatile or non-volatile. Non-volatile memory, e.g., flash memory, can store data for extended periods of time even in the absence of an external power source. Volatile memory devices, e.g., DRAM, may lose their stored state over time unless they are periodically refreshed by an external power source. Certain aspects of volatile memory may offer performance advantages, such as faster read or write speeds, while aspects of non-volatile, such as the ability to store data without periodic refreshing, may be advantageous.

When transferring data between devices, a memory controller may read data from a source device to data storage within the memory controller, and then write the data to a target device from the data storage within the memory controller. Additionally, in many cases a memory controller may have different types of interfaces for different storage devices, such as a volatile memory and a non-volatile memory. Such designs also may result in the memory controller being fully involved to facilitate the transfer of data. Accordingly, it may be beneficial to provide techniques that allow for enhanced memory controller efficiency and data transfer efficiency between different electronic devices.

BRIEF DESCRIPTION OF THE DRAWINGS

Embodiments of the disclosure are described with reference to the following figures.

DETAILED DESCRIPTION

Figure 1:
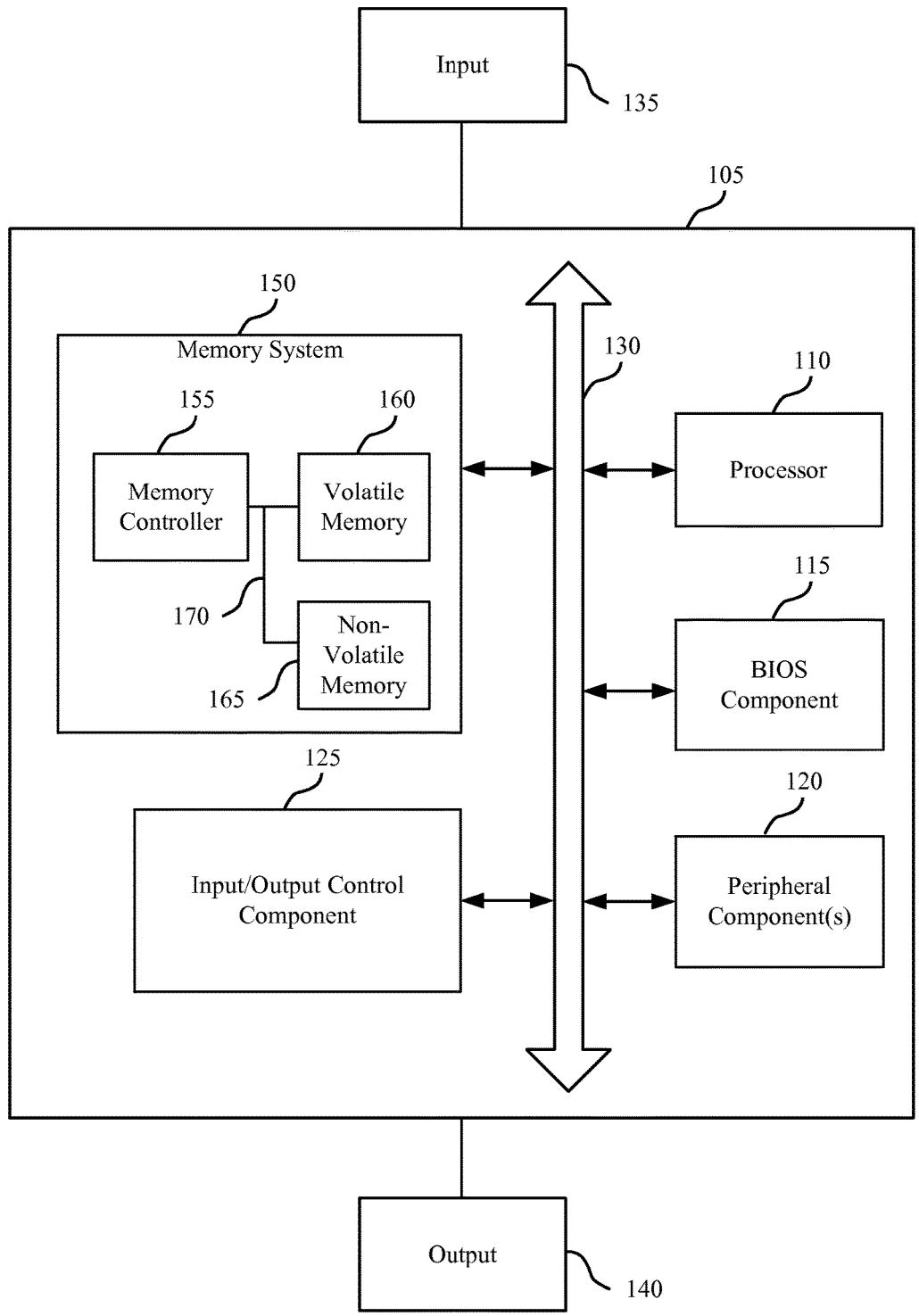
FIG. 1 illustrates a block diagram of a device, including a memory system, that supports data transfer directly between data storage components using a shared bus, in accordance with various embodiments of the present disclosure.

Various embodiments of the present disclosure provide for direct data transfer between devices that share a bus, with reduced involvement from a controller. In some embodiments, a controller, such as a memory controller, a source memory device, and a target memory device may be coupled with a shared bus. In some examples, the shared bus may be a serial peripheral interface (SPI) bus, although other types of busses may be used as well. In some examples, the controller may include a processor (e.g., a microprocessor), or may be operated under the control of a processor. The controller may identify a source address in the source memory device for data to be transferred to the target memory device. The controller also may identify a target address in the target memory device, and initiate a transfer of the data directly from the source memory device to the target memory device via the bus. The controller may send a command to the first memory device to read data, which also may be received at the second memory device. In response to the command, the source memory device may read data out to the bus, and the target memory may read the data from the bus and store the data starting at the target address without further commands from the controller. In some embodiments the command to read data from the first memory device may be a read command for the first memory device according to a protocol or command set, and may be a special program command for the second memory device to cause the second memory device to store data provided by the first memory device.

In some examples, the controller may provide an enable signal to the target memory device and write the target address to a target address register in the target memory device. The controller may then provide an enable signal to both the source memory device and target memory device in conjunction with sending the read command. The controller may also provide a clock to the source memory device and target memory device, and the source memory device may read data out to the bus, and the target memory device may read data from the bus, so long as the clock continues to be provided. Thus, the controller, and/or processor managing the controller, may have reduced involvement in the data transfer through simply providing the source and target addresses, the read command, and the enable and clock signals. This may enhance system operation by freeing resources for other processing tasks, as well as reduce an amount of internal memory, such as a cache memory or buffer memory, that may be needed at the controller according to techniques in which the controller actually receives data to be transferred between memory devices. Furthermore, such techniques may reduce system power and processing time over other techniques for data transfer.

Embodiments of the disclosure introduced above are further described below in the context of an electronic system with different devices that may have data to be transferred between devices. Specific examples are described for memory systems that may employ direct data transfer techniques with reduced memory controller involvement. These and other embodiments of the disclosure are further illustrated by and described with reference to apparatus diagrams, system diagrams, and flowcharts that relate to direct data transfer between devices using a shared bus.

FIG. 1 shows a diagram of a system 100 that supports direct data transfer between devices using a shared bus in accordance with various embodiments of the present disclosure. System 100 may include a device 105, which may be or include a printed circuit board to connect or physically support various components. Device 105 may include a processor 110, BIOS component 115, peripheral component(s) 120, and input/output control component 125, and a memory system 150. The components of device 105 may be in electronic communication with one another through a device bus 130. In the example system 100 of FIG. 1, memory system 150 may contain memory controller 155, a volatile memory 160, and a non-volatile memory 165, which may be coupled with the memory controller 155 by a shared bus 170.

Processor 110 may be configured to interface with memory system 150 through memory controller 155. In some cases, processor 110 may perform the functions of memory controller 155, and in other cases the memory controller 155 may be integrated into processor 110. Processor 110 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components, and processor 110 may perform various functions described herein, including direct data transfer between devices using a shared bus. Processor 110 may, for example, be configured to execute computer-readable instructions stored in memory system 150 to cause device 105 perform various functions or tasks.

BIOS component 115 may be a software component that includes a basic input/output system (BIOS) operated as firmware, which may initialize and run various hardware components of system 100. BIOS component 115 may also manage data flow between processor 110 and the various components, e.g., peripheral components 120, input/output controller 125, etc. BIOS component 115 may include a program or software stored in read-only memory (ROM), flash memory, or any other non-volatile memory.

Peripheral component(s) 120 may be any input or output device, or an interface for such devices, that is integrated into device 105. Examples may include disk controllers, sound controller, graphics controller, Ethernet controller, modem, USB controller, a serial or parallel port, or peripheral card slots, such as peripheral component interconnect (PCI) or accelerated graphics port (AGP) slots.

Input/output controller 125 may manage data communication between processor 110 and peripheral component(s) 120, input devices 135, or output devices 140. Input/output controller 125 may also manage peripherals not integrated into device 105. In some cases, input/output controller 125 may represent a physical connection or port to the external peripheral.

Input 135 may represent a device or signal external to device 105 that provides input to device 105 or its components. This may include a user interface or interface with or between other devices. In some cases, input 135 may be a peripheral that interfaces with device 105 via peripheral component(s) 120 or may be managed by input/output controller 125.

Output device 140 may represent a device or signal external to device 105 configured to receive output from device 105 or any of its components. Examples of output device 140 may include a display, audio speakers, a printing device, another processor or printed circuit board, etc. In some cases, output 140 may be a peripheral that interfaces with device 105 via peripheral component(s) 120 or may be managed by input/output controller 125.

As mentioned above, memory system 150 may contain memory controller 155, a volatile memory 160, and a non-volatile memory 165, which may be coupled with the memory controller 155 by a shared bus 170. In some examples, the shared bus 170 may be a SPI bus, and the memory controller 155 may use a single SPI interface to access both the volatile memory 160 and the non-volatile memory 165. Various existing designs for memory controllers may use separate interfaces for volatile and non-volatile memory, and using a shared bus 170 with a single interface may provide for more efficient and less complex design.

The SPI bus of various examples may use a protocol that includes an instruction, and address, and data, all in one command sequence. Such a command sequence may be initiated through providing a chip enable or chip select signal to a particular component (e.g., volatile memory 160 and/or non-volatile memory 165), and completed through deselecting the chip enable or chip select signal. The instruction of the SPI protocol may define the operation to be performed (e.g., a memory read), and the address may identify where the data associated with the instruction is located or is to be written. For example, the instruction may be a read instruction and the address may be a source address indicating a starting memory location of data to be read from volatile memory 160 or non-volatile memory 165. In various examples, following an instruction the SPI protocol may provide dummy cycles between providing the address and output of data to allow a memory or other device to sense the data (e.g., sense the data stored at a particular location in a memory array) before output. Techniques provided herein are described, for several examples, in relation to systems that use a SPI shared bus. However, such techniques may be used in systems that use other types of shared busses having a similar command sequences that may include command, address and data all in a same chip select event.

Figure 2:
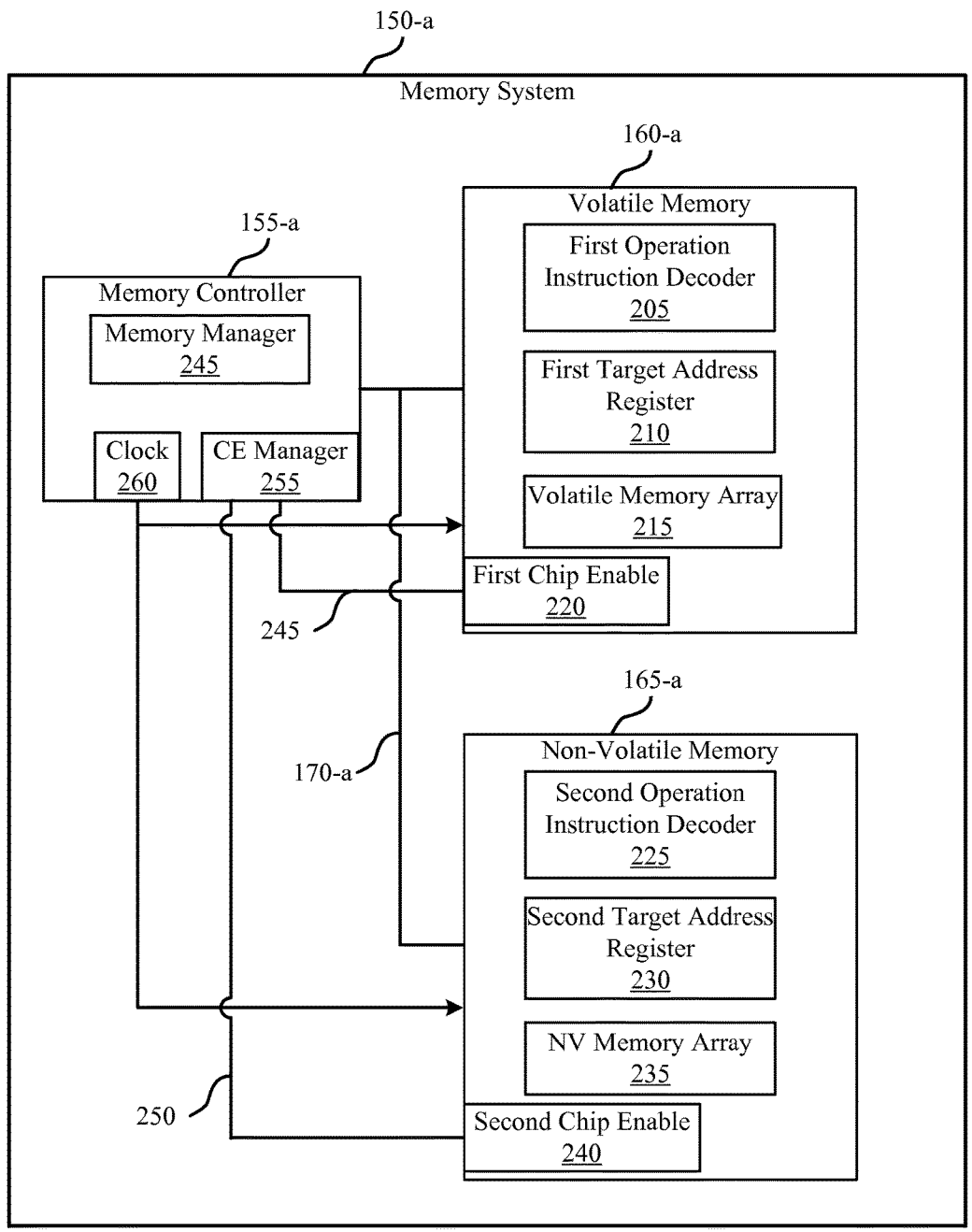
FIG. 2 illustrates a block diagram of a memory system that supports data transfer directly between data storage components using a shared bus, in accordance with various embodiments of the present disclosure.

With reference now to FIG. 2, a more specific example of a system 200 that supports direct data transfer between devices using a shared bus is discussed, in accordance with various embodiments of the present disclosure. System 200 may include a memory system 150-a, which may be an example of memory system 150 of FIG. 1. The memory system 150-a may include a memory controller 155-a, which may be an example of memory controller 155 of FIG. 1, that is coupled with a shared bus 170-a, which may be an example of a shared bus 170 of FIG. 1. Also coupled with the shared bus 170-a is volatile memory 160-a and non-volatile memory 165-a, which may be examples of volatile memory 160 and non-volatile memory 165 of FIG. 1, respectively.

The volatile memory 160-a may include a first operation instruction decoder 205, a first target address register 210, a volatile memory array 215, and a first chip enable 220. The volatile memory 160-a, for example, may be a single integrated circuit, or chip, included in memory system 150-a. In some examples, the volatile memory 160-a may be a memory module of a larger integrated circuit that includes components such as described above. In other examples, the first operation instruction decoder 205, first target address register 210, and volatile memory array 215 may be discrete components included in a memory module (e.g., components mounted on a printed circuit board), and the first chip enable 220 may be used to enable these (and other) components of the memory module.

The first operation instruction decoder 205 may decode instructions that are received via the shared bus 170-*a* and act on the decoded instructions accordingly. The first target address register 210 may be a register into which the memory controller 155-*a* may provide a target address for data to be transferred to the volatile memory 160-*a*. The volatile memory array 215 may include an array of memory cells (e.g., a DRAM or SRAM array). While first target address register 210 is illustrated as separate from the volatile memory array 215, in some examples the first target address register 210 may be a portion of the volatile memory array 215. The first chip enable 220 may be an enable line that causes volatile memory 160-*a* to execute instructions and communicate with other components via the shared bus 170-*a*.

Similarly, the non-volatile memory 165-*a* may include a second operation instruction decoder 225, a second target address register 230, a non-volatile memory array 235, and a second chip enable 240. The non-volatile memory 165-*a*, for example, may be a single integrated circuit, or chip, included in memory system 150-*a*. In some examples, the non-volatile memory 165-*a* may be a memory module of a larger integrated circuit that includes components such as described above. In other examples, the second operation instruction decoder 225, second target address register 230, and non-volatile memory array 235 may be discrete components included in a memory module (e.g., components mounted on a printed circuit board), and the second chip enable 240 may be used to enable these (and other) components of the memory module.

The second operation instruction decoder 225 may decode instructions that are received via the shared bus 170-*a* and act on the decoded instructions accordingly. The second target address register 230 may be a register into which the memory controller 155-*a* may provide a target address for data to be transferred to the non-volatile memory 165-*a*. The non-volatile memory array 235 may include an array of non-volatile memory cells (e.g., an EEPROM or Flash memory array). While second target address register 230 is illustrated as separate from the non-volatile memory array 235, in some examples the second target address register 230 may be a portion of the non-volatile memory array 235. The second chip enable 240 may be an enable line that causes non-volatile memory 165-*a* to execute instructions and communicate with other components via the shared bus 170-*a*. It is noted that the example of FIG. 2 is provided for illustration and discussion purposes, and other examples may include other or additional components. For example, volatile memory 160-*a* and non-volatile memory 165 could be exchanged in this example, or additional memories or interfaces could be coupled with shared bus 170-*a* allowing additional communications between different devices on the shared bus 170-*a*.

The memory controller 155-*a* in this example may include a memory manager 245 and a chip enable (CE) manager 255. The memory manager 245 may provide instructions to volatile memory 160-*a* and non-volatile memory 165-*a*, such as command sequences according to the SPI protocol. The memory controller 155-*a* may be coupled with other external components to provide data from the memory system 150-*a* to other components, or receive data from other components to be stored at the memory system 150-*a*. CE manager 255 may be coupled with the first chip enable 220 of volatile memory 160-*a* via a first chip enable line 245, and may be coupled with the second chip enable 240 of non-volatile memory 165-*a* via a second chip enable line 250. The memory controller 155-*a* may also provide a clock 260 to volatile memory 160-*a* and non-volatile memory 165-*a*.

As mentioned above, the shared bus 170-*a* may be a SPI bus, according to various examples. Various embodiments of the disclosure use the serial protocol of the SPI bus and provide enhanced techniques for transfer of data among the memory controller 155-*a*, the volatile memory 160-*a*, and the non-volatile memory 165-*a*. Both the volatile memory 160-*a* and the non-volatile memory 165-*a* may be servants of the memory controller 155-*a*, with their individual chip enables 220 and 240 that can be separately accessed by the memory controller 155-*a*. In some examples, data may be loaded from the non-volatile memory 165-*a* to the volatile memory 160-*a*, such as program instructions to be executed by a processor external to the memory system, for example. A load data process for such a transfer may move data directly from the non-volatile memory 165-*a* to the volatile memory 160-*a* with limited involvement from the memory controller 155-*a*. Similarly, certain data from the volatile memory 160-*a* may need to be written to the non-volatile memory 165-*a* through a write-back data process that may move data directly from the volatile memory 160-*a* to the non-volatile memory 165-*a* with limited involvement from the memory controller 155-*a*. For clarity, such load data and write-back processes are described separately, although these operations may be combined in some examples.

For a data load process the memory controller 155-*a*, in some examples, may determine a source address in the non-volatile memory 165-*a* for data to be loaded into volatile memory 160-*a*. The memory controller may also determine a target address for storing the data at the volatile memory 160-*a*. The memory controller 155-*a* may initiate the data load process by setting the target address at the first target address register 210 (e.g., by enabling first chip enable 220, writing the target address in first target address register 210, and disabling the first chip enable 220). The memory controller 155-*a* may then send a command sequence via the shared bus 170-*a* that is received at both the volatile memory 160-*a* and the non-volatile memory 165-*a*. Such command may, in some examples, be an established read command according to the SPI protocol and may include a read command and the source address. As mentioned above, existing techniques for moving data from the non-volatile memory 165-*a* to the volatile memory 160-*a* may include a read command that moves the data starting at the source address to a data cache in memory controller 155-*a*. According to techniques described herein, however, the both the non-volatile memory 165-*a* and volatile memory 160-*a* may receive the read command and listen for the command sequence, and transfer the data directly without the data being stored at the memory controller 155-*a*, or having the memory controller 155-*a* involved with the actual movement of the data.

In some examples, the memory manager 245, through the CE manager 255, may provide chip enable signals to both the first chip enable 220 and the second chip enable 240, which allows both the non-volatile memory 165-*a* and volatile memory 160-*a* to listen for the read command. As mentioned, the read command may be followed by the source address, which the volatile memory may ignore, and the memory controller 155-*a* may provide a clock to each of the non-volatile memory 165-*a* and volatile memory 160-*a*. The non-volatile memory 165-*a*, in accordance with the read command that is decoded at second operation instruction decoder 225, may output data starting at the source address from the non-volatile memory array 235 and may continue outputting data at consecutive memory locations from the source address so long as the clock 260 continues to be provided by the memory controller 155-*a*. The first operation instruction decoder 205 at the volatile memory 160-*a* may also receive and decode the read command, ignore the source address, and store data provided by the non-volatile memory 165-*a* to the shared bus 170-*a* in the volatile memory array 215 starting at the location of the target address. The reading of data, and corresponding storage of the data, continues for the duration of time that the clock 260 is provided to the volatile memory 160-*a* and non-volatile memory 165-*a*. In such a manner, the memory controller 155-*a* may move data directly from non-volatile memory 165-*a* to volatile memory 160-*a* with limited involvement of, and without storage of data in a cache or buffer at, the memory controller 155-*a*. Similar operations may be used for write-back operations from the non-volatile memory 165-*a* to the volatile memory 160-*a*, with the target address for the write-back data stored at the second target address register 230 and a read command issued to read data from the volatile memory 160-*a* to the shared bus 170-*a*.

As discussed, techniques described for various embodiments of the disclosure involve the first operation instruction decoder 205 and the second operation instruction decoder 225 both receiving commands from the memory controller 155-*a*. For a data load process, the non-volatile memory 165-*a* may treat the instruction as a read operation while the volatile memory 160-*a* treats it as write operation. Similarly, for a write-back process, the volatile memory 160-*a* may treat the instruction as a read operation while the non-volatile memory 165-*a* treats it as write operation. These instructions may be defined to meet the timing requirement for both the volatile memory 160-*a* and the non-volatile memory 165-*a*. These instructions may also utilize the existing non-volatile and volatile memory read commands defined in the SPI protocol as long as such instructions are unique to each part. For example, if the "0Bh" instruction (the existing FAST read command in SPI flash non-volatile memory) has not been used in the volatile memory side for any SPI operation, this command may be defined as write command in the volatile memory side. The first instruction decoder 205 may then understand the FAST read command and translate the command sequence to a write sequence, with knowledge of the data output expected from the non-volatile memory 165-*a*, and can latch data provided to the shared bus 170-*a* with the correct clock and timing.

Further, as mentioned, each of the volatile memory 160-*a* and the non-volatile memory 165-*a* may have a target address register. Such an address register may be used because the source address is provided in the command sequence while the target address is not provided. For example in load data process, the command sequence contains the address that the non-volatile memory 165-*a* needs to send out, however it may not be the target address that the memory controller 155-*a* needs on the volatile memory 160-*a*. Thus before the automatic operation, the memory controller 155-*a* provides the volatile memory 160-*a* with the target address where the data from non-volatile memory 165-*a* is to be loaded. Similarly for the write back operation, memory controller 155-*a* sets the non-volatile memory 165-*a* second target address register 230 so the data from the volatile memory 160-*a* can be written back to the correct location. In some examples, new command sequences which include both source and target addresses may be defined. However using a target address register can reduce the change to the existing protocol and may provide enhanced flexibility. Operations for a data shadowing operation from non-volatile memory 165-*a* to the volatile memory 160-*a* can be illustrated similarly.

Figure 3:
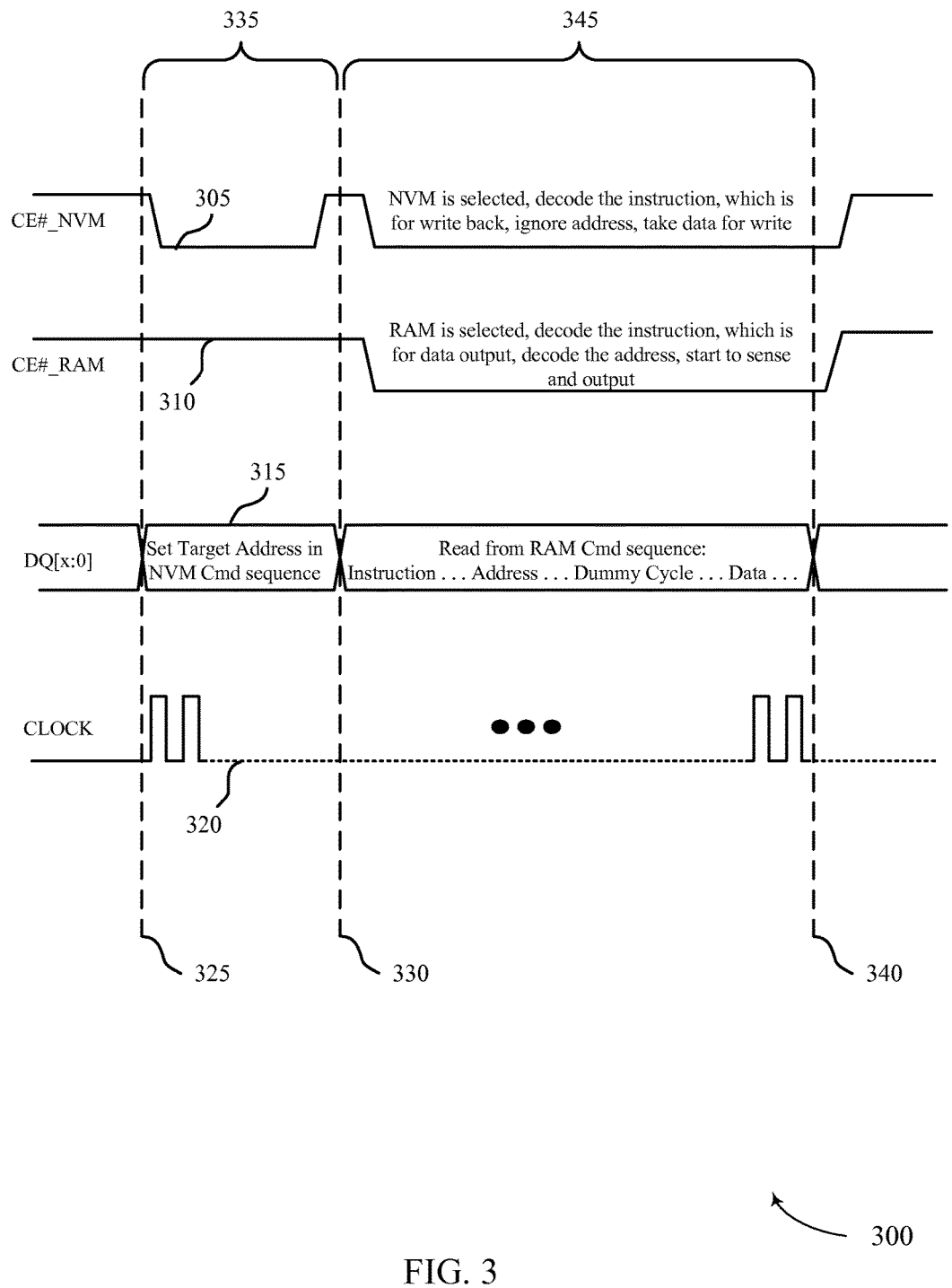
FIG. 3 illustrates a timing diagram for multiple data storage devices that provide direct data transfer between devices using a shared bus in accordance with various embodiments of the present disclosure.

FIG. 3 shows a timing diagram 300 of signals provided from a memory controller to memory devices that support direct data transfer using a shared bus in accordance with various embodiments of the present disclosure. Signals of timing diagram 300 may be provided, for example, by memory controller 155 as discussed above with respect to FIG. 1 and FIG. 2. In the example of FIG. 3, a non-volatile memory chip enable signal 305 (CE#_NVM) may be provided to a non-volatile memory, such as non-volatile memory 165-*a* of FIG. 1 or FIG. 2. A volatile memory chip enable signal 310 (CE#_RAM) may be provided to a volatile memory, such as volatile memory 160-*a* of FIG. 1 or FIG. 2. A data signal 315 (DQ[x:0]) may be provided on a shared bus, such as shared bus 170 of FIG. 1 or FIG. 2. A clock 320 also may be provided. In the example of FIG. 3, operations for a write-back operation from a volatile memory to a non-volatile memory are illustrated.

Initially, at time 325, the controller may provide a low chip enable signal 305 to non-volatile memory that causes the non-volatile memory to latch data from the data signal 315. In this example, the data signal 315 may provide an instruction to set a target address, along with a target address, during a first time period 335. Further, during this first time period 335, the chip enable 310 is high, which causes the volatile memory to remain non-enabled and thus not receive this instruction. Following such an instruction, the chip enable signal 305 is de-asserted as high, and then both chip enable signals 305 and 310 are set to be low at time 330, to enable both the non-volatile memory and the volatile memory. The clock 320 is provided to both as well, for the time duration 345, in which the controller provides a read instruction as the data signal 315 on the shared bus, which is received at both the non-volatile memory and the volatile memory. The non-volatile memory decodes the instruction, recognizes the instruction as a write-back instruction, ignores a source address provided in the instruction, and then senses the shared bus for data output to the bus from the volatile memory. The non-volatile memory stores the sensed data starting at the location identified in the target address. The volatile memory also decodes the read instruction of the data signal 315 on the shared bus, decodes the source address from the instruction, begins sensing the stored data starting at the source address location, and outputs this data to the shared bus. As mentioned above, the command sequence from the memory controller may include a number of dummy cycles that allow the volatile memory to sense stored data, with both the volatile memory and non-volatile memory knowing the number of dummy cycles so as to provide proper timing for the data transfer. These operations continue for the duration of time period 345. When the time period 345 expires at time 340, the memory controller may deselect both chip enable signals 305 and 310, and discontinue providing clock 320.

While the above examples describe different memory components that may be coupled with a shared bus, techniques described herein may be used by other devices in addition to memory devices for direct transfer of data between such devices. For example, such techniques may be used in embedded systems that may include sensors, secure digital cards, and liquid crystal displays, to name but a few examples. Such electronic devices may use techniques such as described herein for transfer of data with limited involvement from a controller.

Figure 4:
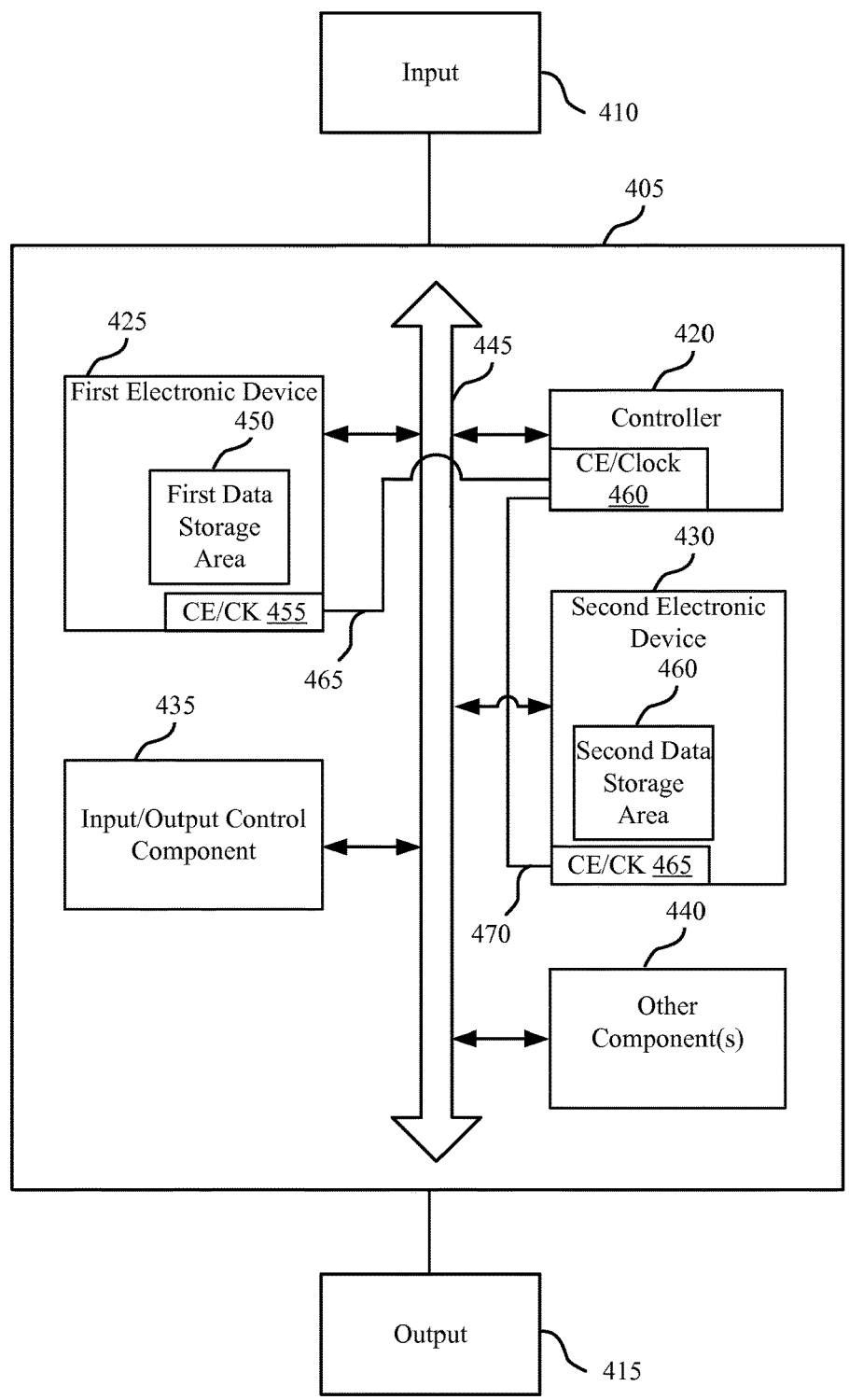
FIG. 4 illustrates a block diagram of an electronic system that supports data transfer directly between data storage components using a shared bus, in accordance with various embodiments of the present disclosure.

FIG. 4 illustrates a system 400 that supports direct data transfer between different types of devices using a shared bus, in accordance with various embodiments of the present disclosure. System 400 may include a device 405, which may be or include a printed circuit board to connect or physically support various components. Device 405 may include a controller 420, a first electronic device 425, a second electronic device 430, an input/output control component 435, and optionally one or more other components 440. The components of device 405 may be in electronic communication with one another through a shared bus 445, which may be an example of shared bus 170 of FIG. 1 or FIG. 2. In the example system 400 of FIG. 4, the first electronic device 425 may include a first data storage area 450 and a chip-enable/clock input 455. Similarly, the second electronic device 430 may include a second data storage area 460 and an associated chip-enable/clock input 465.

Controller 420 may be configured to interface with the first electronic device 425, second electronic device 430, input/output control component 435, and/or other components 440 through the shared bus 445. Controller may, in some examples, initiate a direct data transfer between devices in a manner such as described above. In some cases, controller 420 may perform the functions of memory controller 155 as described above with respect to FIGS. 1-3. Controller 420 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components, and controller 420 may perform various functions described herein, including direct data transfer between devices using shared bus 445. Controller 420 may, for example, be configured to execute computer-readable instructions to cause device 405 perform various functions or tasks.

Input/output control component 435 may manage data communication between controller 420 to external components and may represent a physical connection or port to external components. Input 410 may represent a device or signal external to device 405 that provides input to device 405 or its components. This may include a user interface or interface with or between other devices. In some cases, input 435 may be a peripheral that interfaces with device 405 or may be managed by input/output control component 435. Output device 415 may represent a device or signal external to device 405 configured to receive output from device 405 or any of its components. Examples of output device 415 may include a display, audio speakers, a printing device, another processor or printed circuit board, etc. In some cases, output 415 may be a peripheral that interfaces with device 405.

As mentioned above, controller 420 may cause one or more components of device 405 to directly transfer data to one or more other components of device 405. In some examples, the controller 420, through the CE/clock component 460, may provide chip enable signals and clock signals to devices that are to transfer data. In the example, of FIG. 4, the first electronic device 425 may be a source device, and the second electronic device 430 may be a target device. Thus, data stored in first data storage area 450 may be transferred via shared bus 445 to the second data storage area 460 of second electronic device. In this example, the first electronic device 425 may include a chip enable/clock input 455, and the second electronic device 430 may also include a chip enable/clock input 465. The controller may use CE/Clock component 460 to select and clock first electronic device 425 and second electronic device 430, and provide instructions and addresses to the shared bus 445, to initiate and complete direct data transfers between first electronic device 425 and second electronic device 430 in a manner similarly as discussed above with respect to FIGS. 1-3.

Figure 5:
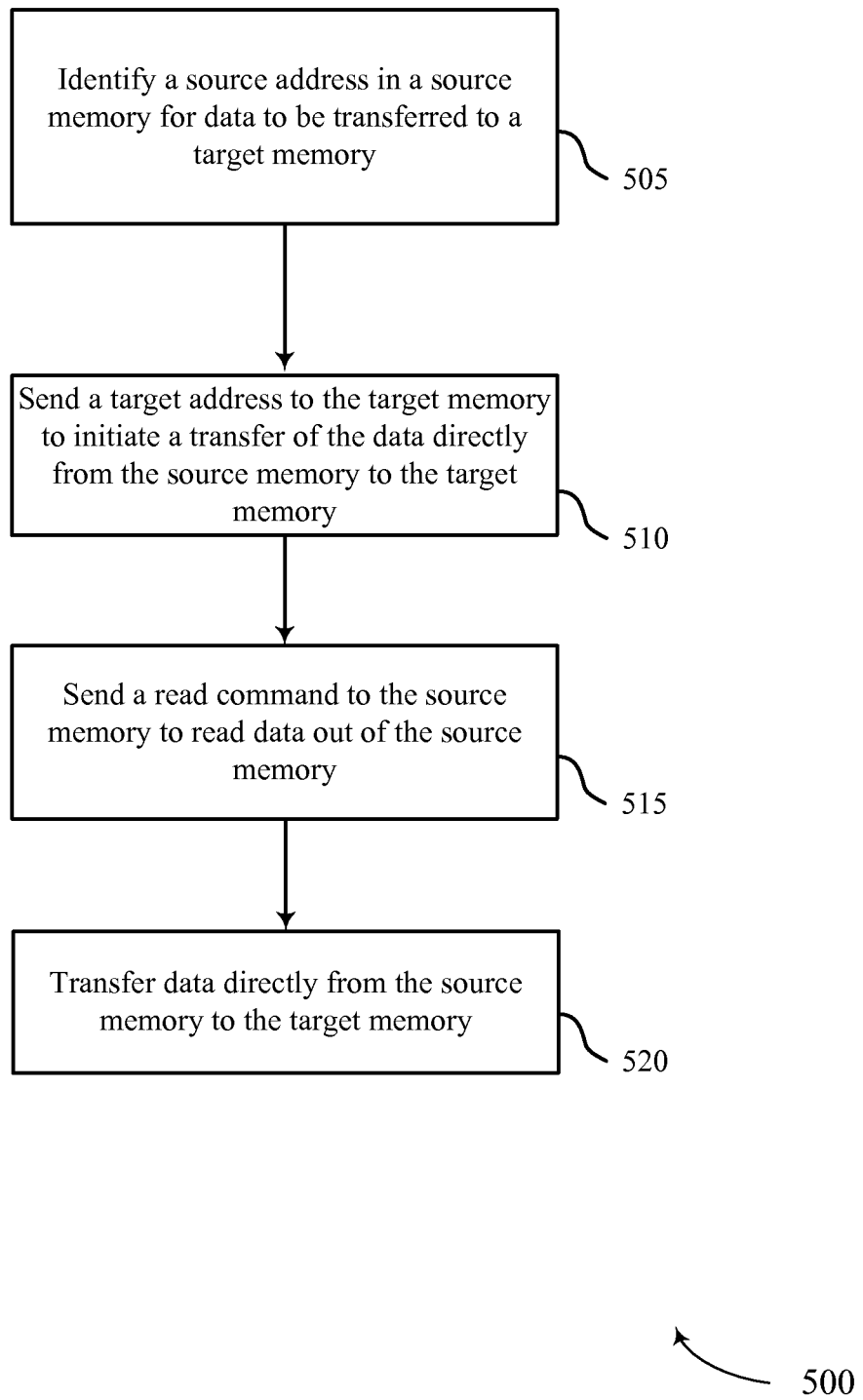
FIGS. 5-7 are flowcharts that illustrate methods for data transfer directly between data storage components using a shared bus in accordance with various embodiments of the present disclosure.

FIG. 5 illustrates an example of a flow chart 500 for direct data transfer between devices using a shared bus, in accordance with various embodiments of the present disclosure. Flow chart 500 may illustrate embodiments of direct data transfer between devices using a shared bus and may be implemented in a device 105, memory system 150, or device 405 as described above with reference to FIGS. 1-4.

In some examples, a device, such as a memory controller 155 or controller 420, may identify a source address in a source memory for data to be transferred to a target memory, as indicated at block 505. Such an identification may be made, for example, by a memory manager such as memory manager 245, and may identify a starting address for data stored at a source device, as discussed above with respect to FIGS. 1-4. For example, a source memory device may contain program code for execution by a processor that is stored in a non-volatile memory at the source device. The processor may identify the program code to be executed at the processor and provide this information to the memory manager, which may then identify the source address in order to move the identified data from the non-volatile memory to a volatile memory, or target memory, that may be more readily accessed by the processor for execution of the program code. In some examples, the controller, source memory, and target memory may be coupled with a shared bus that may be used to transfer commands and data between devices on the bus.

At block 510, the device may send a target address to the target memory to initiate a transfer of the data directly from the source memory to the target memory, as discussed above with respect to FIGS. 1-4. The device, for example, may identify the target address as an address where data from the source memory is to be stored in the target memory. For example, a memory controller may designate an area of a volatile memory for storage of program code to be executed by a processor, and may use a starting address of the identified area as the target address. The controller may send the target address to the target memory, in some examples by selecting a chip enable at the target memory, providing a clock to the target memory, outputting a command to a shared bus to set the target address in a target address register at the target memory, and outputting the target address. The target memory may decode the command, latch the data from the shared bus, and store the data in the target address register at the target memory. The source memory may be, in some examples, a non-volatile memory, and the target memory may be a volatile memory, although numerous other examples may provide a source memory and target memory that are other types of memory or data storage components of other types of devices (e.g., displays, sensors, cards, etc.).

At block 515, the device may send a read command to the source memory to read data out of the source memory, as discussed above with respect to FIGS. 1-4. The read command may include an indication that data is to be read out of the source memory, and may include a starting address for the data to be read. The controller may send the read command, in some examples by selecting a chip enable at the source memory and at the target memory, providing a clock to the source memory and target memory, outputting a data output instruction to the shared bus, and outputting the source address. The source memory may decode the command (e.g., at an operation instruction decoder), latch the data from the shared bus, and begin transferring data starting at the source address to the shared bus. Additionally, as a chip enable and clock may be provided to the target memory concurrently with the chip enable and clock that are provided to the source memory, the target memory may decode the read command, identify the read command as initiating the transfer of data, ignore the source address in the read command, and start storing data provided to the shared bus by the source memory.

At block 520, the source memory may transfer data directly from the source memory to the target memory, as discussed above with respect to FIGS. 1-4. The source memory may perform the transfer by providing the data to a shared bus, which may be read from the shared bus by the target memory. Such data may be stored in the target memory starting at the target address that was previously provided to the target memory. Such a transfer may then continue so long as a clock is provided to the source memory and target memory, according to some examples. Thus, a device such as a memory controller may determine a time duration for providing the clock based on an amount of data that is to be read from the source memory and a rate at which the data is read from the source memory or a rate at which data can be written to the target memory.

Figure 6:
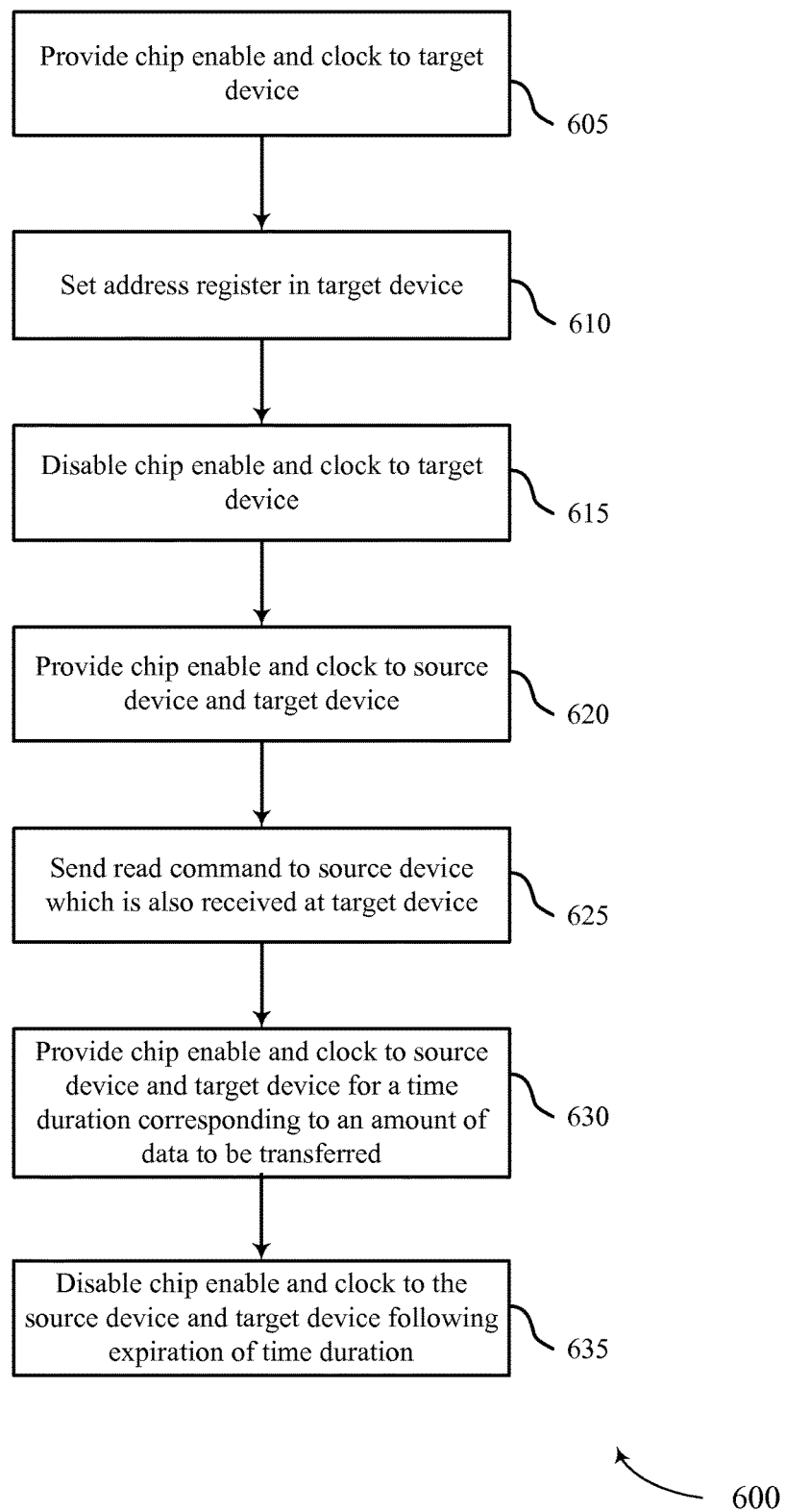

FIG. 6 illustrates an example of a flow chart 600 for direct data transfer between devices using a shared bus, in accordance with various embodiments of the present disclosure. Flow chart 600 may illustrate embodiments of direct data transfer between devices using a shared bus and may be implemented in a device 105, memory system 150, or device 405 as described above with reference to FIGS. 1-4.

In some examples, a device, such as a memory controller 155 or controller 420, may provide a chip enable and clock to a target device, as indicated at block 605. The chip enable, or chip select, and clock may prompt the target device to begin reading one or more commands and/or data from a shared bus, similarly as discussed above with respect to FIGS. 1-4. The shared bus, in some examples, may be a SPI bus, or other type of bus having an associated protocol that provides a command and subsequent data in a command sequence, such as discussed above.

At block 610, the device may set an address register in target device, similarly as discussed above with respect to FIGS. 1-4. The device, for example, may identify a target address as an address where data from the source device (e.g., a source memory device) memory is to be stored in the target device (e.g., a target memory device), and set the address register with this target address. For example, a memory controller may designate an area of a volatile memory for storage of program code to be executed by a processor, and may use a starting address of the identified area as the target address.

At block 615, the device may disable the chip enable and clock to the target device, similarly as discussed above with respect to FIGS. 1-4. The device, for example, after providing the target address for storage in the target address register, may deselect the target device (e.g., a target memory device) thus completing the command sequence being provided to the target device to set the address register.

At block 620, the device may provide a chip enable and clock to the source device and to the target device, similarly as discussed above with respect to FIGS. 1-4. Providing the chip enable and clock to each of the source and target devices, also as discussed above, results in both the source and target devices attempting to decode a command provided on the shared bus and any data that follows the command, and initiate a new command sequence for the devices.

At block 625, the device may send a read command to the source device which is also received at the target device, similarly as discussed above with respect to FIGS. 1-4. As both the source device and target device are enabled and clocked, the read command may be received at each device. In some examples, an operation instruction decoder at each device may decode the read command, which may indicate to the device that data is to be transferred between the source device and the target device.

At block 630, the device may provide the chip enable and clock to the source device and the target device for a time duration corresponding to an amount of data to be transferred, similarly as discussed above with respect to FIGS. 1-4. The source device and target device may thus perform a direct transfer of data, with the source device providing the data to a shared bus, which may be read from the shared bus by the target device. Such data may be stored in the target device starting at the address that was provided to the address register at block 610. The time duration for providing the clock and chip enable by the device (e.g., memory controller 155 or controller 420) may be based on an amount of data that is to be read from the source device and a rate at which the data is read from the source device or a rate at which data can be written to the target device.

At block 635, the device may disable the chip enable and clock to the source device and target device following expiration of time duration, similarly as discussed above with respect to FIGS. 1-4. Following the time duration, the device (e.g., memory controller 155 or controller 420) may determine that the data has all been transferred, and may deselect the first memory device and the second memory device.

Figure 7:
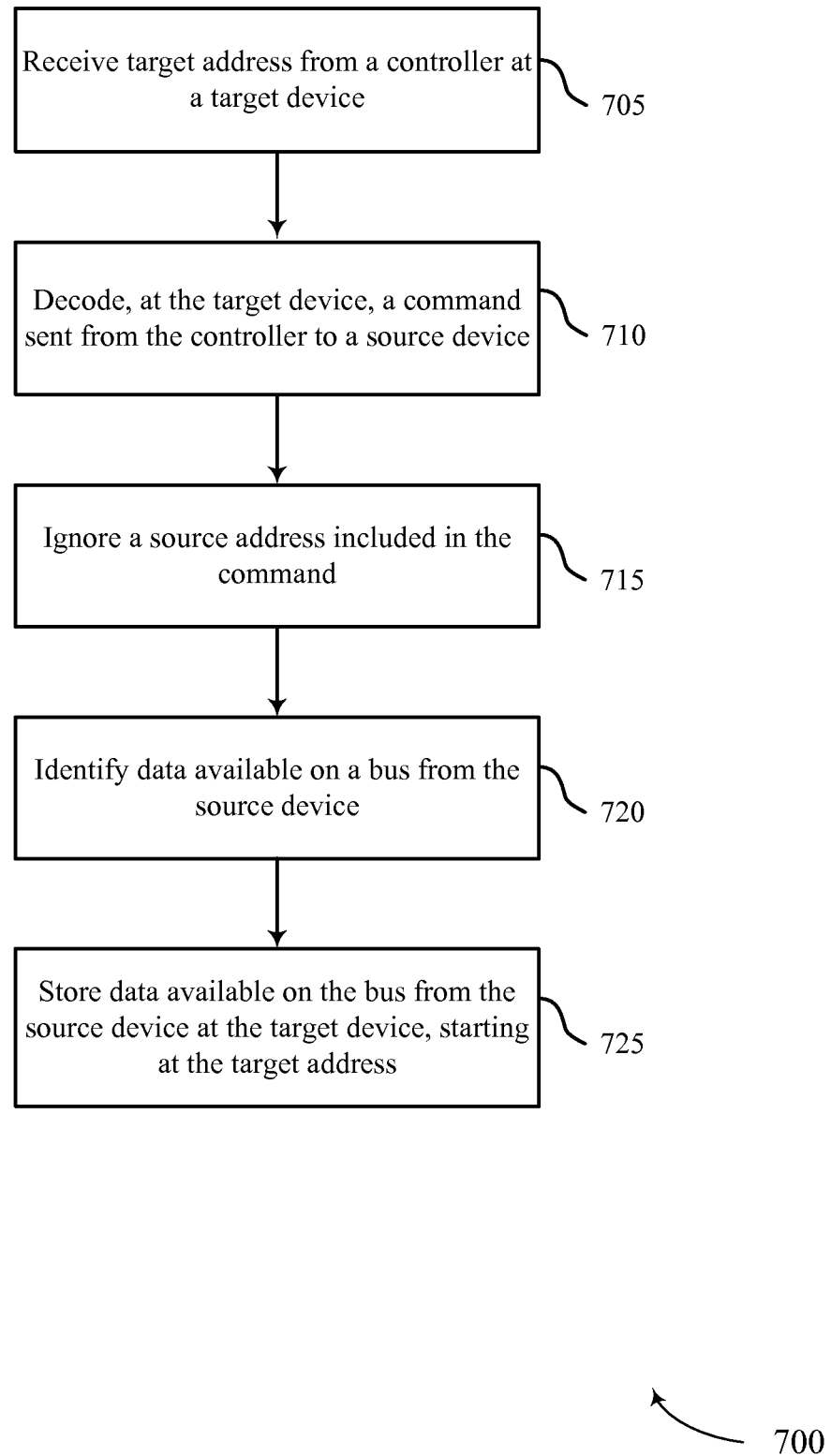

FIG. 7 illustrates an example of a flow chart 700 for direct data transfer between devices using a shared bus, in accordance with various embodiments of the present disclosure. Flow chart 700 may illustrate embodiments of direct data transfer between devices using a shared bus and may be implemented in a device 105, memory system 150, or device 405 as described above with reference to FIGS. 1-4.

In some examples, a target device (e.g., non-volatile memory 165, volatile memory 160, or second electronic device 430) may receive a target address from a controller (e.g., memory controller 155 or controller 420), as indicated at block 705 and similarly as discussed above with respect to FIGS. 1-4. The controller may send the target address, in some examples, by selecting a chip enable associated with the device, providing a clock to the device, outputting a command to a shared bus to set the target address in a target address register at the target device, and outputting the target address. The target device may decode the command, latch the data from the shared bus, and store the data in the target address register, according to various examples.

At block 710, the target device may decode a read command sent from the controller to a source device, similarly as discussed above with respect to FIGS. 1-4. The read command may include an indication that data is to be read out of a source device, and may include a starting address for the data to be read. The target device may decode the command (e.g., at an operation instruction decoder), latch the data from the shared bus, and store the data starting at the target address.

At block 715, the target device may ignore a source address included in the command, similarly as discussed above with respect to FIGS. 1-4. As discussed above, the target device may have its target address stored in target address register, and the target address may be different than the source address at which the data is stored at the source device. Thus, if a command includes a source address, the target device may simply ignore this information as it is not relevant to the target device. As mentioned above, in some other examples a command sequence may include both a source and target address, in which cases the operations of blocks 710 and 715 may be combined, and the respective source or target device may ignore the address associated with the other device. For example, a command sequence may be in the form "<CMDcode|Add1|Add2>" in which Add1 would be a source address and Add2 would be a target address In such an example, the source and target devices may be enabled with a chip enable, and may decode the CMDcode, which may designate which device is the source and which device is the target (or such a designation may be made in advance).

At block 720, the target device may identify data available on a bus from the source device, similarly as discussed above with respect to FIGS. 1-4. The data available on the bus may be data transferred to the shared bus from the source device (e.g., as resulting from the read command sent by the controller to the source device). In some examples, the target device may wait for a predetermined number of clock cycles associated with providing the source address to the shared bus and dummy cycles to provide sufficient time for the source device to sense the data stored at the source address, and identify subsequent information on the shared bus as the data transferred from the source device.

At block 725, the target device may store data transferred to the bus from the source device starting at the target address, similarly as discussed above with respect to FIGS. 1-4. Such a transfer may then continue so long as a clock is provided to the source device and target device, according to some examples. Thus, a device such as a memory controller may determine a time duration for providing the clock based on an amount of data that is to be read from the source device and a rate at which the data is read from the source device or a rate at which data can be written to the target device.

Thus, methods 500, 600, and 700 may provide for direct data transfer using a shared bus. It should be noted that methods 500, 600, and 700 describe possible implementations, and the operations and steps may be rearranged or otherwise modified such that other implementations are possible. In some examples, aspects from two or more of the methods 500, 600, and 700 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

The description set forth herein, in connection with the appended drawings, describes example configurations and does not represent all the examples that may be implemented or that are within the scope of the claims. The terms "example" and "exemplary," as used herein, mean "serving as an example, instance, embodiment, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. When the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The term "electronic communication" refers to a relationship between components that supports electron flow between the components. This may include a direct connection between components or may include intermediate components. Components in electronic communication may be actively exchanging electrons or signals (e.g., in an energized circuit) or may not be actively exchanging electrons or signals (e.g., in a de-energized circuit) but may be configured and operable to exchange electrons or signals upon a circuit being energized. By way of example, two components physically connected via a switch (e.g., a transistor) are in electronic communication regardless of the state of the switch (i.e., open or closed).

The devices discussed herein may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The various illustrative blocks, components, and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of operating a memory system, comprising:
   identifying, at a memory controller, a source address in a source memory for data to be transferred to a target memory, wherein the memory controller, the source memory and the target memory are each coupled with a bus; and
   sending, by the memory controller, a command comprising a target address to the target memory to initiate a transfer of the data directly from the source memory to the target memory via the bus, wherein the command comprises a single command sequence that is received at both the source memory and the target memory, wherein the single command sequence indicates a read operation at the source memory and a write operation at the target memory, and wherein the read operation and the write operation occur concurrently.

2. The method of claim 1, further comprising:
   transferring, by the source memory, data starting at the source address to the bus.

3. The method of claim 2, wherein the command is sent to the source memory via the bus, and wherein the method further comprises:
   receiving, by the target memory via the bus, the command; and
   storing, in the target memory starting at the target address, subsequent data provided to the bus from the source memory.

4. The method of claim 3, wherein the command comprises a data output instruction and the source address, and wherein receiving the command by the target memory comprises:
   identifying the command as initiating the transfer of data; and
   ignoring the source address.

5. The method of claim 1, wherein sending the command further comprises:
   providing a chip enable signal to both the source memory and the target memory; and
   providing a clock to the source memory and the target memory for a time duration.

6. The method of claim 5, wherein the time duration corresponds to an amount of data to be transferred from the source memory to the target memory.

7. The method of claim 1, wherein the bus comprises a serial peripheral interconnect (SPI) bus.

8. The method of claim 1, wherein the source memory comprises one of a non-volatile memory or a volatile memory and the target memory comprises one of a non-volatile memory or a volatile memory.

9. A method of operating a memory system, comprising:
   setting a target address in a target memory for storage of data to be received at the target memory via a bus that is coupled with the target memory and a source memory; and
   sending a command to both the source memory and the target memory to read data out of the source memory to the bus and store the data from the bus at the target memory, wherein the command comprises a single command sequence that is received at both the source memory and the target memory, wherein the single command sequence indicates a read operation at the source memory and a write operation at the target memory, and wherein the read operation and the write operation occur concurrently.

10. The method of claim 9, wherein setting the target address comprises:
    providing the target address to a target address register of the target memory.

11. The method of claim 10, further comprising:
    receiving, at an operation instruction decoder of the target memory, the command; and
    initiating, at the target memory, storage of the data from the bus following the command, starting at the target address.

12. The method of claim 11, further comprising:
    transferring, by the source memory, data starting at a source address to the bus; and
    storing, by the target memory, the data from the bus.

13. The method of claim 9, further comprising:
providing a chip enable signal to both the source memory and the target memory; and
providing a clock to the source memory and the target memory for a time duration.

14. The method of claim 13, wherein the time duration corresponds to an amount of data to be transferred from the source memory to the target memory.

15. The method of claim 9, wherein the bus comprises a serial peripheral interconnect (SPI) bus.

16. The method of claim 9, wherein the source memory comprises one of a non-volatile memory or a volatile memory and the target memory comprises one of a non-volatile memory or a volatile memory.

17. An apparatus for data transfer, comprising:
a first electronic device coupled with a bus, the first electronic device comprising a first data storage area;
a second electronic device coupled with the bus, the second electronic device comprising a second data storage area; and
a controller coupled with the bus and in electronic communication with the first electronic device and the second electronic device, wherein the controller is operable to:
identify a source address in the first data storage area for data to be transferred from the first data storage area to the second data storage area,
identify a target address in the second data storage area, and
initiate a transfer of the data directly from the first electronic device to the second electronic device via the bus through a command that comprises a single command sequence that is received both the first electronic device and the second electronic device , wherein the single command sequence indicates a read operation at the first electronic device and a write operation at the second electronic device, and wherein the read operation and the write operation occur concurrently.

18. The apparatus of claim 17, wherein the second electronic device comprises a target address register, and wherein the controller is further operable to set the target address in the target address register for storage of the data to be transferred.

19. The apparatus of claim 17, wherein the second electronic device comprises an operation instruction decoder that is operable to receive the command from the controller to initiate the transfer of the data.

20. The apparatus of claim 17, wherein the controller comprises a single interface with the bus to access both the first electronic device and the second electronic device.

21. The apparatus of claim 17, wherein the controller is further operable to:
provide a chip enable signal to both the first electronic device and the second electronic device; and
provide a clock to both the first electronic device and the second electronic device for a time duration that corresponds to an amount of data to be transferred from the first data storage area to the second data storage area.

22. The apparatus of claim 17, wherein the first electronic device comprises one of a non-volatile memory or a volatile memory and the second electronic device comprises one of a non-volatile memory or a volatile memory.

23. An electronic memory apparatus, comprising:
a source memory module coupled with a bus;
a target memory module coupled with the bus; and
a controller coupled with the bus and in electronic communication with the source memory module and the target memory module, wherein the controller is operable to:
set a target address in the target memory module for storage of data to be received at the target memory module via the bus, and
send a command to the source memory module to read data out of the source memory module to the bus, and
wherein the target memory module is operable to receive the data read out of the source memory module directly via the bus, and wherein the command comprises a single command sequence that is received at both the source memory module and the target memory module, wherein the single command sequence indicates a read operation at the source memory module and a write operation at the target memory module, and wherein the read operation and the write operation occur concurrently.

24. The apparatus of claim 23, wherein the target memory module comprises a target address register, and wherein the controller is further operable to set the target address in the target address register for storage of the data to be transferred.

25. The apparatus of claim 24, wherein the target memory module further comprises an operation instruction decoder that is operable to receive the command from the controller.

26. The apparatus of claim 23, wherein the controller is further operable to:
provide a chip enable signal to both the source memory module and the target memory module; and
provide a clock to both the source memory module and the target memory module for a time duration that corresponds to an amount of data to be transferred from the source memory module to the target memory module.

27. The apparatus of claim 23, wherein the bus comprises a serial peripheral interconnect (SPI) bus.

28. An electronic memory apparatus, comprising:
a volatile memory comprising a target address register and an operation instruction decoder;
a non-volatile memory comprising data to be transferred to the volatile memory;
a serial peripheral interface (SPI) bus coupled with both the volatile memory and the non-volatile memory; and
a controller coupled with the SPI bus and operable to set a target address in the target address register, and send a command to the non-volatile memory to initiate a transfer of the data to the SPI bus, and
wherein the operation instruction decoder decodes the command and receives data from a non-volatile memory module directly from the SPI bus and stores the data starting at the target address, and wherein the command comprises a single command sequence that is received at both the volatile memory and the non-volatile memory, wherein the single command sequence indicates a read operation at the non-volatile memory and a write operation at the volatile memory, and wherein the read operation and the write operation occur concurrently.

29. The apparatus of claim 28, wherein the volatile memory further comprises a first enable line, and wherein the controller is further operable to:
activate the first enable line; and
provide the target address to the SPI bus to set the target address in the target address register.

30. The apparatus of claim 29, wherein the non-volatile memory further comprises a second enable line, and wherein the controller is further operable to:
- activate both the first enable line and the second enable line; and
- provide the command to the SPI bus to be read at both the volatile memory and the non-volatile memory.

31. The apparatus of claim 30, wherein the controller is further operable to:
- provide a clock to both the volatile memory and the non-volatile memory for a time duration that corresponds to an amount of data to be transferred from the volatile memory to the non-volatile memory.

* * * * *